United States Patent [19]

Sundquist

[11] Patent Number: 4,690,102

[45] Date of Patent: Sep. 1, 1987

[54] WATER HEATER AND DISTILLER APPARATUS

[76] Inventor: Glen Sundquist, Box 823, Watrous, Saskatchewan, Canada, S0K 4T0

[21] Appl. No.: 5,551

[22] Filed: Jan. 20, 1987

Related U.S. Application Data

[62] Division of Ser. No. 802,675, Nov. 29, 1985, abandoned.

[30] Foreign Application Priority Data

Dec. 6, 1984 [CA] Canada ................................. 469526

[51] Int. Cl.$^4$ ......................... F22B 5/00; F24D 3/00
[52] U.S. Cl. ................................. 122/13 R; 122/20 B; 122/16; 237/9 R; 237/8 R; 237/19
[58] Field of Search ............... 237/8 R, 8 A, 9 R, 19; 122/20 B, 33, 13 R, 16-19

[56] References Cited

U.S. PATENT DOCUMENTS

| | | | |
|---|---|---|---|
| 1,070,175 | 8/1913 | Ponninghans | 237/19 |
| 1,931,719 | 10/1933 | Comstock | 237/19 |
| 2,126,732 | 8/1938 | Carnes | 237/9 |
| 2,211,573 | 8/1940 | McGrath | 237/19 |
| 2,581,146 | 1/1952 | Schaub | 237/9 |
| 2,781,174 | 2/1957 | Smith | 237/8 R |
| 3,033,192 | 5/1962 | Bogren | 237/19 |
| 3,202,355 | 8/1965 | Carlson | 237/8 R |
| 4,512,288 | 4/1985 | Michaud | 122/20 B |
| 4,562,956 | 1/1986 | Check | 237/8 R |

*Primary Examiner*—Henry C. Yuen
*Attorney, Agent, or Firm*—Adrian D. Battison

[57] ABSTRACT

A water heater and distiller apparatus is provided in which condensing steam is the distilling portion of the apparatus giving up its latent heat to water which is being heated in the water heating portion of the apparatus. In a preferred embodiment, products of combustion which are used to boil water in the distiller boiler, are later passed in heat exchange relation with the water heating tank in the water heating portion of apparatus. It is believed that the present apparatus is both energy efficient and uncomplicated as compared to the prior art.

7 Claims, 3 Drawing Figures

WATER HEATER AND DISTILLER APPARATUS

This application is a divisional application of my copending application Ser. No. 802,675 filed Nov. 29, 1985 now abandoned.

BACKGROUND OF THE INVENTION

The present invention relates to the field of water heating and distilling apparatus and in particular to such apparatus wherein the condenser of the distilling apparatus is incorporated with a water heating apparatus to effect energy conservation.

Distilling apparatus and water heating apparatus is, of course, well known. In many geographic localities, water is not potable and consequently it must be distilled or otherwise treated prior to being consumed by humans or animals or in many well known processes. Moreover, water heating equipment is often utilized in buildings in which equipment is installed to distill or otherwise treat water.

Typically,, when water distillation equipment has been installed adjacent water heating equipment, latent heat available from the condensing of steam in the distillation process has been merely wasted. In some cases, such heat is considered a nuisance because it must be transferred to the exterior of a building to keep the temperature of an equipment room with acceptable levels.

SUMMARY OF THE INVENTION

It is therefore an object of the present invention to provide a device for distilling and heating water which utilizes, for heating water, latent heat given off by water condensing during a distillation process.

It is a further object of the present invention to provide an apparatus for distilling water and heating water concurrently which obviates and mitigates from the difficulties and disadvantages of the prior art.

According to an aspect of the present invention there is provided a water heater and distiller apparatus adapted for utilizing latent heat of water condensing in a distilling process for heating water, said water heater and distiller apparatus comprising, a boiler chamber means for containing water to be boiled to steam, said boiler chamber means having an inlet for receiving water from a water supply and an outlet disposed for delivery of steam thereout said boiler chamber being closed except for said inlet and said outlet, heating means for boiling water in said boiler chamber means. A water heating tank means for containing water to be heated, said water heating tank means having an inlet for receiving water from a water supply and an outlet for passage of heated water thereout. A condenser means disposed for being cooled by water in said water heating tank means, said condenser means having an inlet for receiving steam, an outlet for delivery of condensate thereout and means for collection of condensate from said outlet and arranged such that said condensate is removed for use separate from said boiler chamber means, duct means communicating with said outlet of said boiler chamber means and said inlet of said condenser means for delivery of steam from said boiler chamber means to said condenser means, a reservoir disposed laterally of said boiler chamber means, said reservoir being open to air pressure, flow control means for controlling the flow of water from said reservoir for maintaining the level of water in said boiler chamber means below a predetermined maximum and above a predetermined minimum, said flow control means comprising a float valve controlled by a float, said float valve being adapted for closing upon said level of water moving to said predetermined maximum and adapted for opening upon moving of said water level to said predetermined minimum, conduit means communicating water from said reservoir to said boiler chamber means, at least a portion of the length of said conduit means being disposed entirely downwardly of said predetermined minimum so as to form a gas trap for impeding venting of steam from said boiler chamber means through said conduit, and heating means separate from said condenser means for heating said water to be heated.

DESCRIPTION OF THE DRAWINGS

The invention and the advantages thereof will be more fully explained by reference to preferred embodiments described in relation to the drawings in which.

DETAILED DESCRIPTION OF PREFERRED EMBODIMENTS

Figure 1:
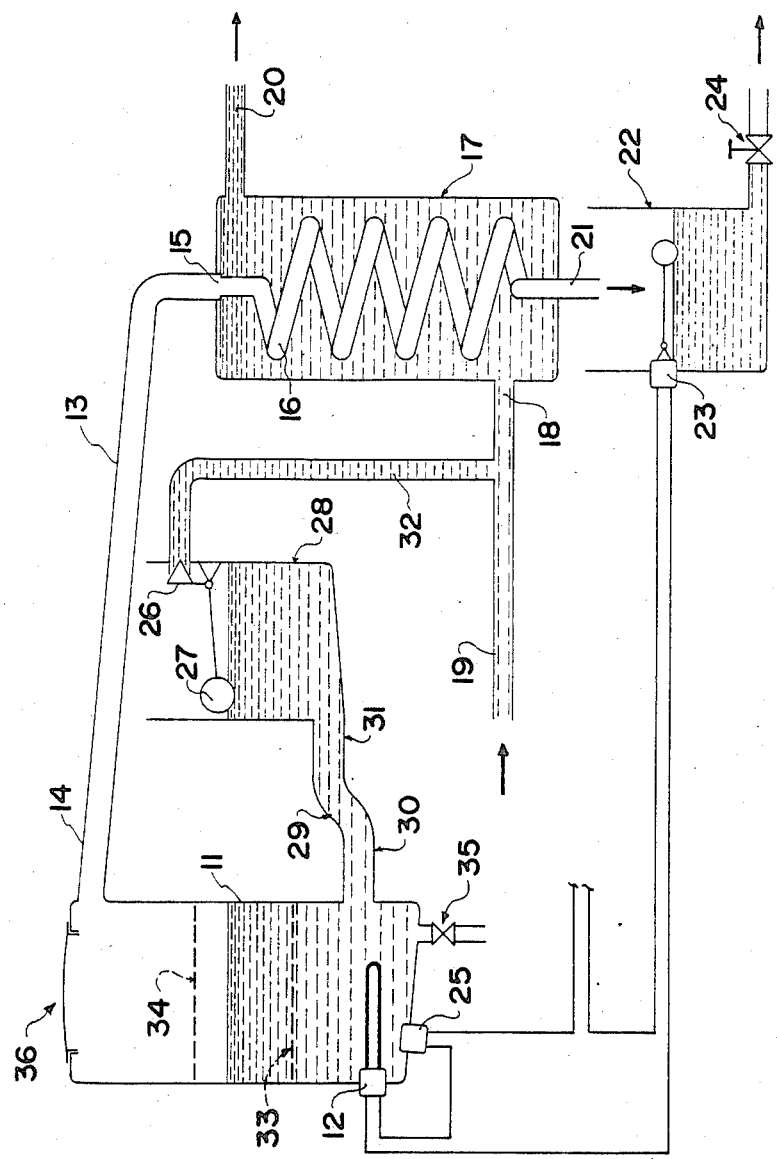
FIG. 1 illustrates a schematic of a preferred embodiment of a water heater and distillar apparatus adapted for use in preheating water for introduction into a conventional water heating tank.

According to a preferred embodiment, a water heater and distiller apparatus is illustrated in FIG. 1.

A boiler 11 is provided in which an electrical heater 12, is provided for boiling water to steam. A duct 13 is provided in communication with an outlet 14 of boiler 11 for conveying steam from the boiler 11 to an inlet 15 of a condenser means, such as tube 16. Tube 16 passes through a water heating tank 17. Steam generated in boiler 11 passes through outlet 14, duct 13, inlet 15 and into tube 16. Tank 17 has an inlet 18 for receiving water from a water supply 19 typically but not necessarily the domestic water supply of a building. Tank 17 also has an outlet 20 for passage of heated water out of tank 17.

Steam entering tube 16 condenses on the interior of tube 16 and gives up the latent heat available on a change of state of water from a gas to a liquid. Condensation occurs, of course, due to the fact that the interior of tube 16 is cooled by water passing through tank 17. Condensate forming in tube 16 drains by gravity through outlet 21 of tube 16 and is received by a container 22.

The condenser means could, of course, be provided by a condenser having a plurality of passages in acting in parallel to receive steam and pass condensate to container 22. Furthermore, tube 16 may advantageously be provided integral with a wall of tank 17. Further, it may be advantageous to provide, in place of container 22, a further conduit communicating with the outlet 21 of tube 16 for conveying distilled water to a point of utilization. However, in the event that container 22 is utilized a float control switch 23 may be used for turning off heater 12 when the level of distilled water in container 22 goes above a predetermined level. Valve 24 can be utilized for draining distilled water from container 22. Safety switch 25 may also preferrably be provided for turning off heater 12 in the event of a loss of feed water to boiler 11.

A float valve 26, actuated by float 27, is provided for maintaining the level of water in a reservoir 28 within a predetermined range. A conduit 29 is provided in communication with an inlet 30 of boiler 11 and an outlet 31 of reservoir 28 for conveying of liquid between reservoir 28 and boiler 11. Float valve 26 controls flow from a pipe 32 supplied from water supply 19, typically, but not necessarily, the domestic water system of a building. Float valve 26 is adapted so that it will open should the level of water in reservoir 28 drop below a predetermined range and so that it will close should the level of water rise above said predetermined range. It is apparent that, the lower limit of the predetermined range should be above heater 12. Futhermore the lower limit of said predetermined range can preferrably be above at least a portion of the length of conduit 29 so that a gas trap is formed for inhibiting venting of steam from boiler 11 through conduit 29 upon the level of water in boiler 11 rising above the lower limit of the predetermined range. A suitable lower limit of the predetermined range could conceivably be as indicated by numeral 33. A gas trap so provided will allow sufficient pressure to build in boiler 11 to cause steam to flow through duct 13. However, the gas trap so provided will vent gases prior to damaging pressures being developed as a result of unintentional blocking of duct 13 or tube 16. The outlet 14 must remain at all times higher than the upper level of the predetermined range within which the level of water may fluctuate. A suitable upper limit of the predetermined range could conceivably be as indicated by numeral 34.

Conduit 29 may advantageously be of a length sufficient for allowing boiler 11 to be insulated and reservoir 28 may advantageously be disposed sufficiently laterally from boiler 11 so that water in reservoir 28 remains relatively cool in relation to water in boiler 11. By maintaining water in reservoir 28 relatively cool, less heat will be lost through evaporation from the surface of water in reservoir 28 and through conduction of heat through the walls of reservoir 28. Furthermore, if water in reservoir 28 is maintained relatively cool, it is believed that mineral build up on float valve 26 will occur more slowly than if the water in reservoir 28 was at a higher temperature. A valve 35 may be provided for draining reservoir 28 and boiler 11 from time to time. A sealable cover 36 may be provided on boiler 11 for providing access for cleaning.

Figure 2:
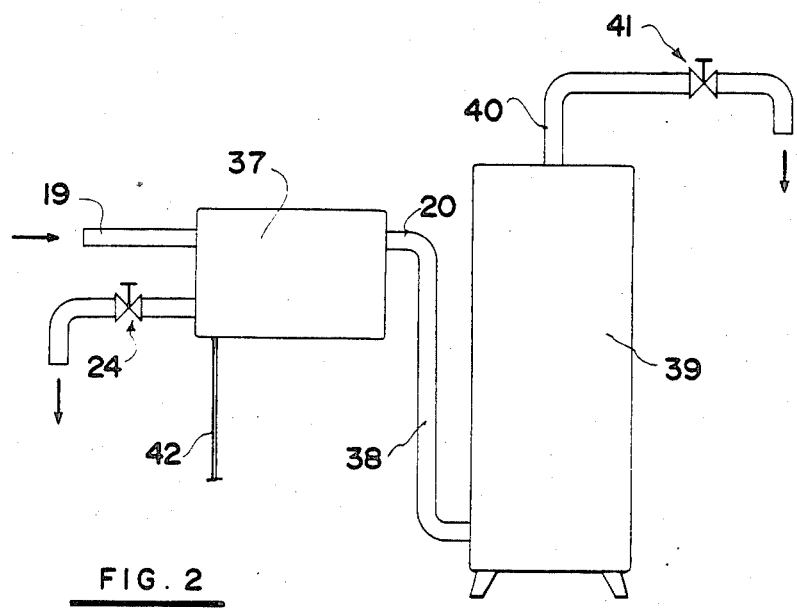
FIG. 2 illustrates a schematic of a domestic water system including a preferred embodiment of a water heater and distiller apparatus.

FIG. 2 illustrates a water heater and distiller apparatus 37 installed in a domestic water system of a building. The water heater and distiller apparatus 37 is connected to a water supply 19 under pressure suitable for a domestic water system in a building. A water pipe 38 receives water heated in water heater and distiller 37. Distilled water is available upon opening a valve 24.

The operational cycle of the water heater and distiller apparatus will now be described in relation to FIG. 1. Water flows from water supply 19 through float valve 26 until reservoir 28 and boiler 11 are filled to upper limit 34 of a predetermined range. Initially container 22 is empty. Float control switch 23 thus indicates a low level in container 22 and closes to provide electrical power to electrical heater 12. Electrical heater 12 boils water in boiler 11 to produce steam. The steam exits through outlet 14 passes through duct 13 to tube 16. The volume within tank 17 surrounding tube 16 is filled with water which has entered tank 17 through inlet 18 from water supply 19. Water in tank 17 cools the tube 16 to cause steam within tube 16 to condense and drain by gravity through outlet 21 of tube 16 into container 22.

Normal operation of float valve 26 maintains the level of water in reservoir 28 and boiler 11 above lower level 33 of a predetermined range. In this preferred embodiment lower level 33 is above at least a portion of the length of conduit 29 and thus a gas trap is formed for assuring that steam generated in boiler 11 normally exits through duct 13. However should duct 13 or tube 16 become blocked the gas trap will vent steam through conduit 29 to prevent damage to boiler 11. When a demand for heated water arises water is drawn from tank 17 through outlet 20 of tank 17. Water drawn from tank 17 is replaced by water from water supply 19.

Assuming a constant temperature of water from water supply 19, the temperature of water leaving outlet 20 of tank 17 will depend upon the rate of flow of water through tank 17 and the rate at which water is condensing in tube 16 neither of which is necessarily constant. It may therefore be advantageous to use the water distiller and heater apparatus as a preheater for a conventional water heater as illustrated in FIG. 2. In such an arrangement, whenever heated water is allowed to flow through valve 41, water supply 19 causes water to flow through tank 17 and water pipe 38 into conventional water heater 39.

Figure 3:
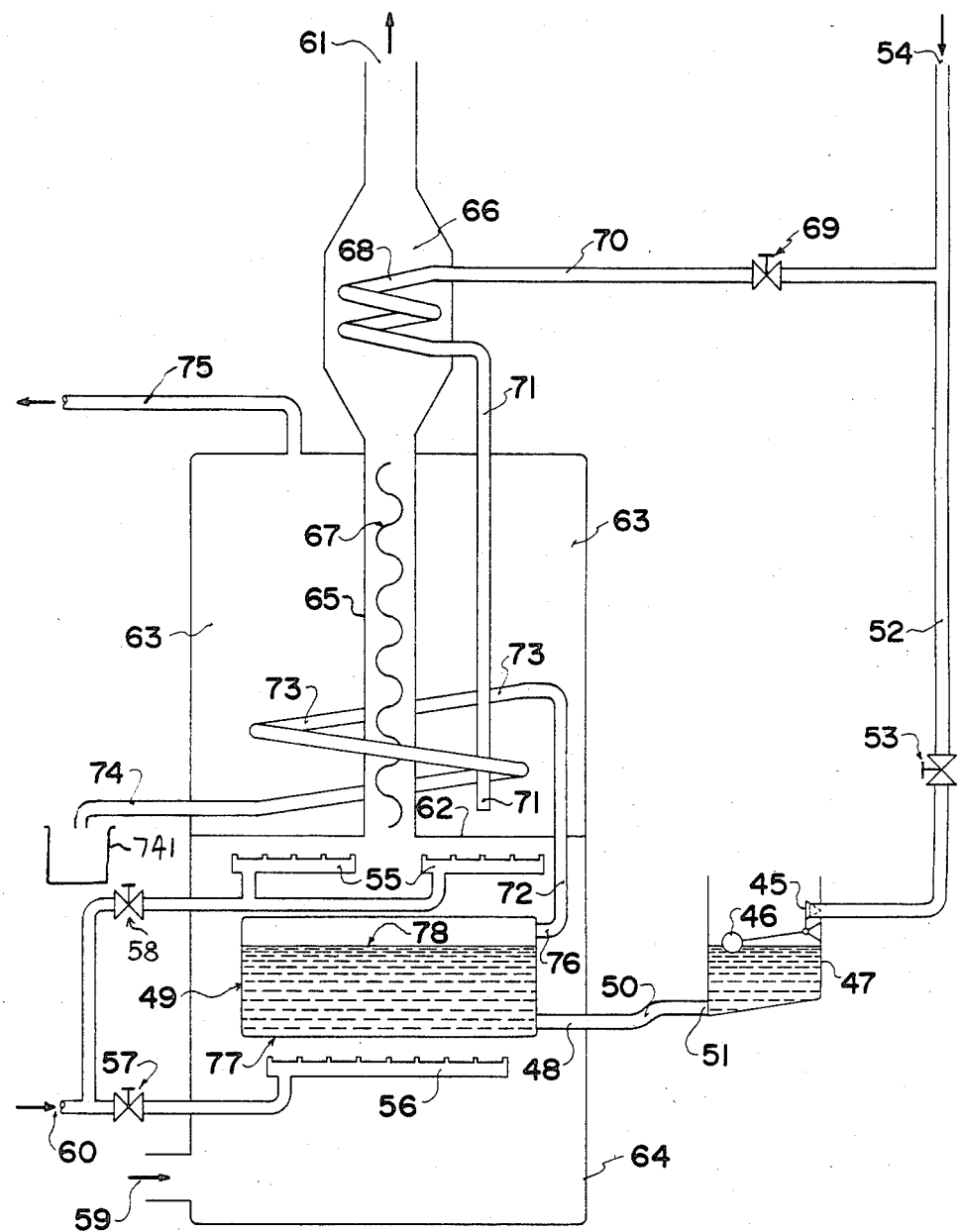
FIG. 3 illustrates a schematic of yet another preferred embodiment wherein a water heater and distiller apparatus is incorporated in a natural gas domestic water heater.

Turning to FIG. 3, there is illustrated schematically another preferred embodiment wherein a water heater and distiller apparatus is incorporated in a natural gas domestic water heater.

As illustrated in FIG. 3, there is provided in this embodiment a float valve 45, a float 46 and a reservoir 47 such as float valve 26, float 27 and reservoir 28 illustrated in FIG. 1. Moreover as illustrated in FIG. 3 there is also provided in this embodiment an inlet 48 to a boiler 49 communicating through a conduit 50 with an outlet 51 of reservoir 47 in a like manner to the embodiment of FIG. 1. Water can be introduced to reservoir 47 through a conduit 52 and a manual control valve 53 from a water source 54.

In the preferred embodiment illustrated in FIG. 3, there is a water heating tank 63 having a vertical combustion gas flue 65 passing vertically therethrough from a combustion chamber 64 to a heat exchanger 66. Flue 65 contains a baffle 67 for causing turbulence in combustion gases rising through flue 65 to enhance the conduction of heat from the combustion gases to water in water heating tank 63. Baffle 67 advantageously can be of heat conducting material contacting flue 65 to further facilitate heat conduction to the water in tank 63. Heat exchanger 66 is an air-to-water heat exchanger in which heat obtained from combustion gases rising from flue 65 into heat exchanger 66 is conducted through the walls of pipe 68 to water contained in pipe 68. Combustion gases exit heat exchanger 66 at outlet 61 which typically connects with a known chimney flue. Water heating tank 63 is supplied with water from water source 54 by means of control valve 69, conduit 70, pipe 68 of heat exchanger 66, and conduit 71. It can be noted that conduit 71 introduces cold water to the bottom 62 of tank 63. Heated water is permitted to exit water heating tank 63 through conduit 75 when heated water is required.

In the preferred embodiment illustrated in FIG. 3, there is a boiler chamber 49 having an inlet 48 and an outlet 76. A condenser coil 73 is provided within water heating tank 63 and a conduit 72 is provided for passage of steam from outlet 76 into conduit 73. Steam condensing in conduit 73 will pass by gravity through distilled water outlet 74 to a collection tank 741.

In the preferred embodiment illustrated in FIG. 3, there is a water heating tank burner 55 disposed above boiler 49 and adjacent the bottom side 62 of water heating tank 63. There is also provided a boiler burner 56 disposed adjacent the bottom side 77 of boiler 49. The flammable gas which is used to fuel boiler burner 56 is controlled by a solonoid valve 57 and a known pilot light apparatus (not shown). Likewise, the flammable gas which is used to fuel water heating tank burner 55 is controlled by a solonoid valve 58 and a known pilot light apparatus (not shown). Both burners 55 and 56 receive their air supply from an air inlet 59 and their flammable gas from a gas supply 60. The burners 55 and 56 are disposed with boiler 49 in combustion chamber 64.

It may be advantageous to route conduit 72 other than as illustrated in FIG. 3. In particular, conduit 72 may be disposed so as to pass laterally through the wall of combustion chamber 64, rise vertically along the outside of the water heating tank 63 and enter water heating tank 63 opposite the highest point of condenser coil 73. If conduit 72 is disposed and insulated in such a position, there will be a minimum of condensation occurring in vertical tube 72 during operation. It is desirable to minimize condensation occurring in conduit 72 because gravity will cause such condensation to flow to boiler 49 rather than distilled water outlet 74 with a resultant reduction in output of the distilling apparatus.

The operation of the preferred embodiment illustrated in FIG. 3 will now be explained. When valve 53 is opened water passes to reservoir 47 and float valve 45 acts to maintain water in boiler 49 at or about a desired level 78 in the manner described in relation to the embodiment illustrated in FIG. 1. Valve 69 is open and water passes through conduit 70, heat exchanger 66, conduit 71 and into water heating tank 63. When water heating tank 63 has been filled gas solonoid valve 57 is opened to fuel boiler burner 56. Burner 56 is of course ignited by the action of the pilot light (not shown). Water in boiler 49 is boiled to steam and the steam passes through outlet 76 into conduit 72 and into condenser coil 73 where it condenses to form distilled water. The distilled water drains down the condenser coil 73 by gravity and exits at distilled water outlet 74. The steam in condenser coil 73 of course condenses due to the fact it gives up its latent heat to the water in water heating tank 63. The products of combustion produced by the operation of burner 56 pass upwards in the combustion chamber and provide heat to the bottom 62 of water heating tank 63 prior to passing upwardly through flue 65. Thus while burner 56 provides heat to boiler 49 and tank 63 it tends to provide higher temperature heat to boiler 49 due to the close proximity of burner 56 and boiler 49. Thus in this mode of operation the condensing of steam in coil 73 is believed to provide the prime means of heating the water in water heating tank 63. Also, for this mode of operation it can be noted that the products of combustion of burner 56 are sequentially cooled by boiler 49, water tank 63 and heat exchanger 66. From a cold start up burner 55 could be operated simultaneously with burner 56. However, once a sufficient stock of distilled water has been obtained through the operation of the illustrated apparatus, burner 56 can be shut down and burner 55 can be operated alone to provide heat for water heating tank 63. In this mode of operation products of combustion of burner 55 give up their heat to water heating tank 63 and heat exchanger 66.

While only certain embodiments of the present invention have been described, it will be apparent to those skilled in the art that various changes and modifications may be made therein without departing from the scope of the invention as claimed.

What is claimed is:

1. A water heater and distiller apparatus adapted for utilizing latent heat of water condensing in a distilling process for heating water, said water heater and distiller apparatus comprising:
    a boiler chamber means for containing water to be boiled to steam, said boiler chamber means having an inlet for receiving water from a water supply and an outlet disposed for delivery of steam thereout said boiler chamber being closed except for said inlet and said outlet;
    heating means for boiling water in said boiler chamber means;
    a water heating tank means for containing water to be heated, said water heating tank means having an inlet for receiving water from a water supply and an outlet for passage of heated water thereout;
    a condenser means disposed for being cooled by water in said water heating tank means, said condenser means having an inlet for receiving steam, an outlet for delivery of condensate thereout and means for collection of condensate from said outlet and arranged such that said condensate is removed for use separate from said boiler chamber means;
    duct means communicating with said outlet of said boiler chamber means and said inlet of said condenser means for delivery of steam from said boiler chamber means to said condenser means;
    a reservoir disposed laterally of said boiler chamber means, said reservoir being open to air pressure;
    flow control means for controlling the flow of water from said reservoir for maintaining the level of water in said boiler chamber means below a predetermined maximum and above a predetermined minimum, said flow control means comprising a float valve controlled by a float, said float valve being adapted for closing upon said level of water moving to said predetermined maximum and adapted for opening upon moving of said water level to said predetermined minimum;
    conduit means communicating between said boiler chamber means and said reservoir for communicating water from said reservoir to said boiler chamber means, at least a portion of the length of said conduit means being disposed entirely downwardly of said predetermined minimum so as to form a gas trap for impeding venting of steam from said boiler chamber means through said conduit; and
    heating means separate from said condenser means for heating said water to be heated.

2. A water heater and distiller apparatus, as claimed in claim 1, wherein said heating means for boiling water in said boiler chamber means includes a gas burner disposed in relation to said boiler chamber means whereby products of combustion from said gas burner will flow in heat-exchange relationship with said boiler chamber means upon ignition of said gas burner;

and wherein said gas burner is disposed in relation to said water heating tank means whereby said products of combustion will subsequently flow in heat-exchange relationship with said water heating tank means.

3. A water heater and distiller apparatus, as claimed in claim 2 wherein said water heater and distiller apparatus includes a combustion chamber, and wherein said boiler chamber means and said gas burner are disposed within said combustion chamber, said gas burner being disposed downwardly of said boiler chamber means and wherein said combustion chamber is in heat-exchange relationship and said water heating tank means.

4. A water heater and distiller apparatus as claimed in claim 2 wherein said water heater and distiller apparatus includes a second gas burner disposed for supplying heat to said water heating tank means, said second gas burner being disposed in relation to said water heating tank means whereby products of combustion of said second gas burner will flow in heat-exchange relationship with said water heating tank means upon ignition of said second gas burner.

5. A water heater and distiller apparatus, as claimed in claim 4 wherein said water heater and distiller apparatus includes a combustion chamber, and wherein said boiler chamber means and said gas burner are disposed within said combustion chamber, said gas burner being disposed downwardly of said boiler chamber means and wherein said combustion chamber is in heat-exchange relationship with said water heating tank means and wherein an upper surface of said combustion chamber is in heat-exchange relationship with said water heating tank means and wherein said second gas burner is disposed in said combustion chamber downwardly of said upper surface of said combustion chamber and upwardly of said boiler chamber means.

6. A water heater and distiller apparatus, as claimed in claim 3, wherein said water heater and distiller apparatus includes at least one flue extending from said combustion chamber through said water heating tank means for delivery of said products of combustion therethrough in heat-exchange relationship with said water heating tank means.

7. A water heating and distiller apparatus, as claimed in claim 6 wherein said water heating and distilling apparatus includes a gas-to-liquid heat exchanger, said heat exchanger including a gas passage having a gas inlet and a gas outlet and said heat exchanger including a liquid passage having a liquid inlet and a liquid outlet;

supply conduit means for delivery of water from said water supply to said liquid inlet of said heat-exchanger and from said liquid outlet of said heat exchanger to said water heating tank means; and exhaust duct means for delivery of products of combustion from said at least one flue to said gas inlet of said heat exchanger.

* * * * *